UNITED STATES PATENT OFFICE.

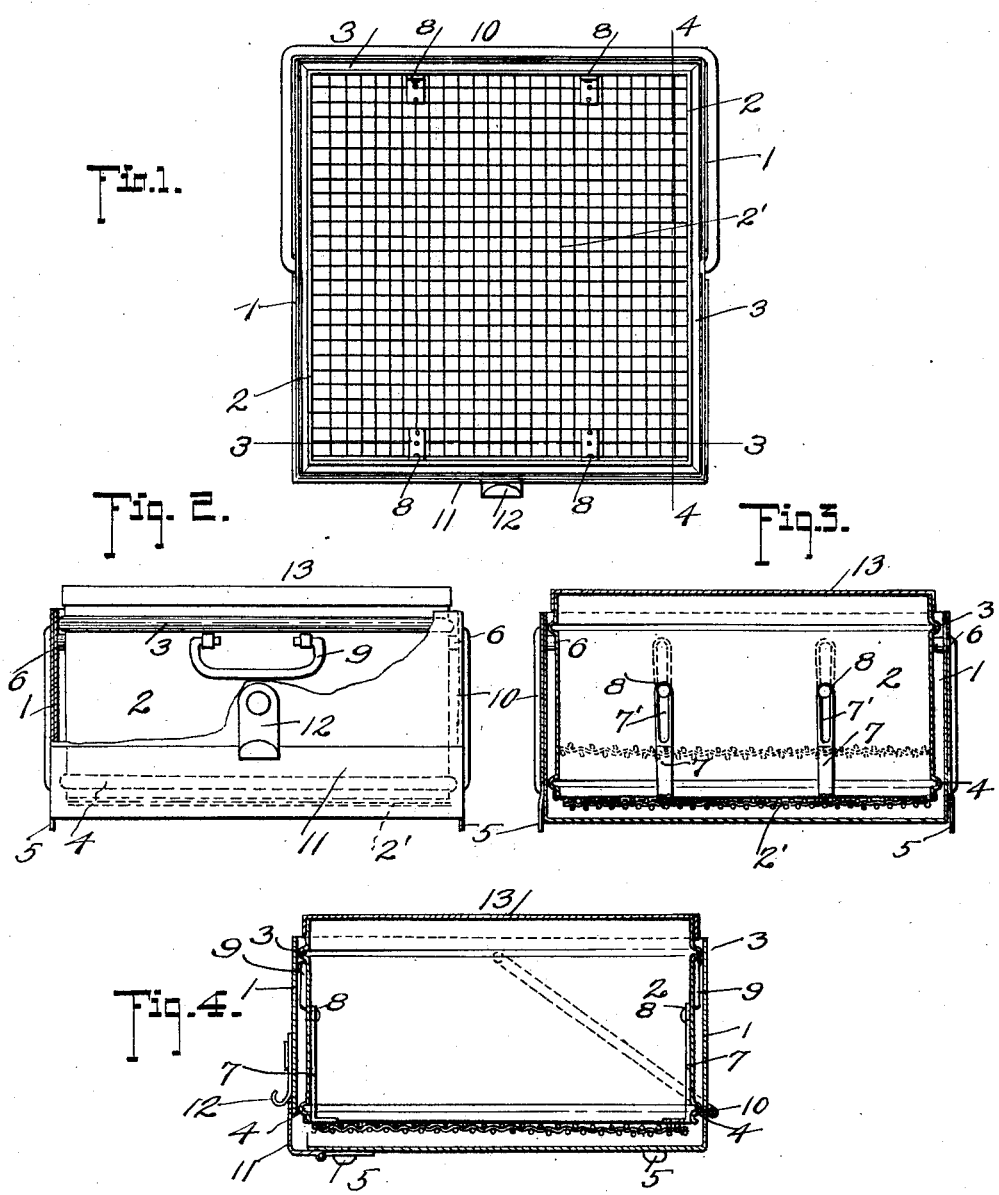

CHARLES VANCE DAME, OF LANARK, ILLINOIS.

COMBINED ASH PAN AND SIFTER.

1,046,990.     Specification of Letters Patent.     Patented Dec. 10, 1912.

Application filed December 26, 1911. Serial No. 667,619.

*To all whom it may concern:*

Be it known that I, CHARLES VANCE DAME, a citizen of the United States, residing at Lanark, in the county of Carroll and State of Illinois, have invented certain new and useful Improvements in Combined Ash Pans and Sifters, of which the following is a specification.

This invention comprises a handy combination ash pan and sifter adapted for use in connection with stoves, latrobes, furnaces, and the like.

The invention involves primarily an outer pan or receptacle containing therein a sifting device or receptacle which is prevented from displacement from the pan by suitable means but which is movable therein and carries a movable sifting bottom adapted to support the ashes and unburned fuel in the pan until a convenient time for performing the sifting operation.

An especial object of the invention is to provide means of the above class of an extremely simple and practical construction capable of being produced at a comparatively small cost, within the means of those persons who would ordinarily have use therefor.

For a full understanding of the present invention, reference is to be had to the following description and to the accompanying drawings, in which—

Figure 1 is a top plan view of a combined pan and sifter in accordance with the invention. Fig. 2 is a front end view showing the upper portion of the end of the pan broken away. Fig. 3 is a section taken about on the line 3—3 of Fig. 1. Fig. 4 is a section taken about on the line 4—4 of Fig. 1.

Throughout the following detail description and on the several figures of the drawings, similar parts are referred to by like reference characters.

In the drawings, 1 denotes an outer receptacle or pan which may be of a form corresponding to ordinary ash pans, some of which are used in connection with stoves and would otherwise be of a shape or form adapted to fit into the ash compartments of the special type of stove or furnace with which the invention will be used. I do not therefore wish to be limited to any special general form for my invention because it would doubtless have to be made differently for different types of heating apparatus.

Within the pan 1 is arranged the sifting receptacle 2 comprising the bottom 2′ and the body portion, the latter being formed at its upper and lower portions with beads or rib-like projections 3 and 4, respectively, preferably pressed outwardly from the metal from which the receptacle 2 is made and located on all four sides of the same. The pan 1 is adapted to be supported by the legs 5 so that when the pan is in the ash compartment of a heater, the bottom of the pan will be spaced from the bottom of said compartment. Projecting inwardly from two or more sides of the pan 1 are lugs or stops 6, the purpose of which will appear more fully hereinafter.

The bottom 2′ of the sifting receptacle 2 is of foraminous material, such as screen, or the like, and said bottom is preferably loosely mounted upon the receptacle 2, being primarily supported by brackets 7 of somewhat L-shape, the lower ends of said brackets being secured to the bottom 2′, and the upper being slotted at 7′ and arranged so that pins or fastenings 8 projecting inwardly from the sides of the receptacle 2 extend through the slots 7′. The size of the foraminous bottom 2′ is such that it may move upwardly in the receptacle 2.

Applied to opposite sides or ends of the receptacle 2 are handles 9 arranged below the upper projections 3 adjacent thereto and adapted to be housed between the adjacent portions of the parts 1 and 2 when the latter are not being used for sifting purposes. A bail or handle 10 is employed to enable the pan and sifter to be readily carried, said handle being attached to the pan.

The side or end of the pan which is outermost when this device is arranged in the ash compartment of a heater is formed with a pivoted door 11 adapted to open downwardly and normally held closed by the pivoted catch 12.

In actual use, it is contemplated that the device, as shown in Fig. 1, shall be arranged in the ash compartment of a heater so that, as the ashes drop from the grate, they will be received by the receptacle 2. A cover 13 is provided for the receptacle 2 but is arranged beneath the pan 1 when the device is in the heater. When it is desired to perform the sifting operation, the cover 13 is placed upon the receptacle 2, as shown in Figs. 2, 3 and 4 and the combined device is removed from the heater with the ashes contained in said receptacle 2. To sift the ashes, it is only necessary to raise the receptacle 2 sufficiently to enable the operator to grasp the handles 9, whereupon a vertical agitating movement may be imparted to the receptacle 2 within the receptacle 1, such vertical movement being limited by the stops 6 that operate between the ribs or projections 3 and 4. In the vertical agitating movement of the receptacle 2, it will be apparent that the sifting operation is facilitated by a vertical movement of the foraminous bottom 2' in said receptacle 2, the latter vertical movement being allowed by the pin and slot 8 and 7' respectively. At the completion of the sifting operation, the sifted material having passed through the bottom 2', is now carried by the bottom of the pan 1 and may be readily removed from the latter by merely opening the door 11.

Having thus described the invention, what I claim as new is:

1. A combined ash pan and sifter comprising an outer pan, a receptacle movably mounted therein consisting of a body and a foraminous bottom movably mounted thereon, and means for preventing displacement of the receptacle from the pan but permitting of relative movement of said parts.

2. A combined ash pan and sifter comprising an outer pan, a receptacle movably mounted therein consisting of a body and a foraminous bottom movably mounted thereon, means for preventing displacement of the receptacle from the pan but permitting of relative movement of said parts, and separate handles carried by the pan and receptacle.

3. In a combined ash pan and sifter, the combination of an outer pan, a sifting receptacle therein having a movable bottom, and members coacting with the pan and receptacle for supporting said receptacle with its bottom spaced from that of the pan and also permitting of limited movement of the receptacle in the pan.

4. In a combined ash pan and sifter, the combination of an outer pan, a sifting receptacle therein having a movable bottom, members coacting with the pan and receptacle for supporting said receptacle with its bottom spaced from that of the pan and also permitting of limited movement of the receptacle in the pan, and a door mounted on the pan opposite the space between its bottom and that of the receptacle.

5. In a combined ash pan and sifter, the combination of an outer pan, an inner receptacle, spaced projections, lugs on the side portions of the pan and engaging with said spaced projections to limit the movement of the receptacle in the pan and to prevent relative displacement of said parts, handles carried by both the pan and inner receptacle, the inner receptacle having a foraminous bottom and brackets secured to said bottom and having pin and slot connections with the inner receptacle permitting movement of the bottom within said receptacle, and a door on the pan adjacent to the bottom of the latter.

In testimony whereof I affix my signature in presence of two witnesses.

CHARLES VANCE DAME.

Witnesses:
ARTHUR E. CURTIS,
HARRY S. LOWMAN.